July 24, 1951  N. M. FOSTER  2,561,618
VALVE ACTUATOR
Filed Sept. 1, 1948  3 Sheets-Sheet 1
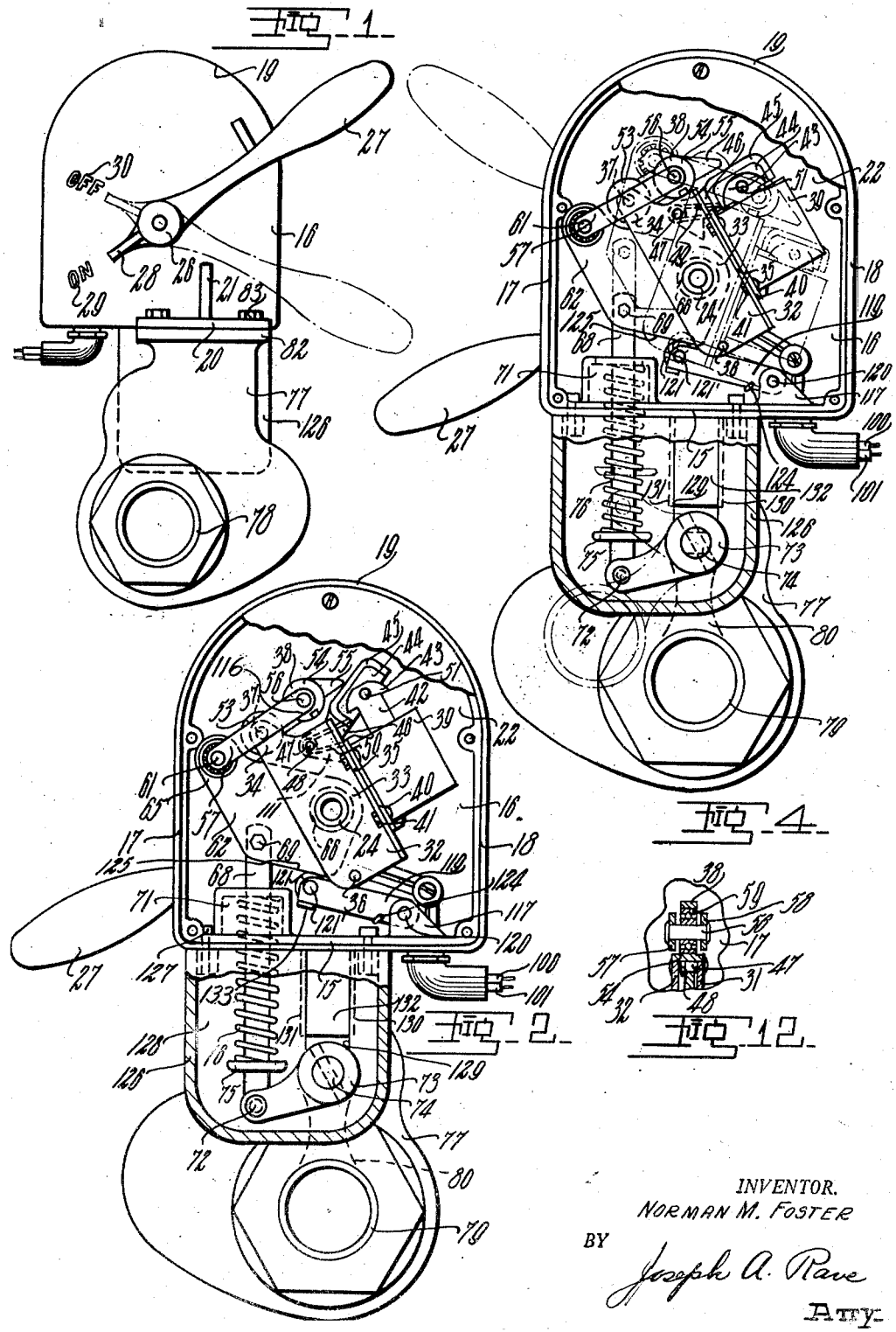
INVENTOR.
NORMAN M. FOSTER
BY
Joseph A. Rane
ATTY.

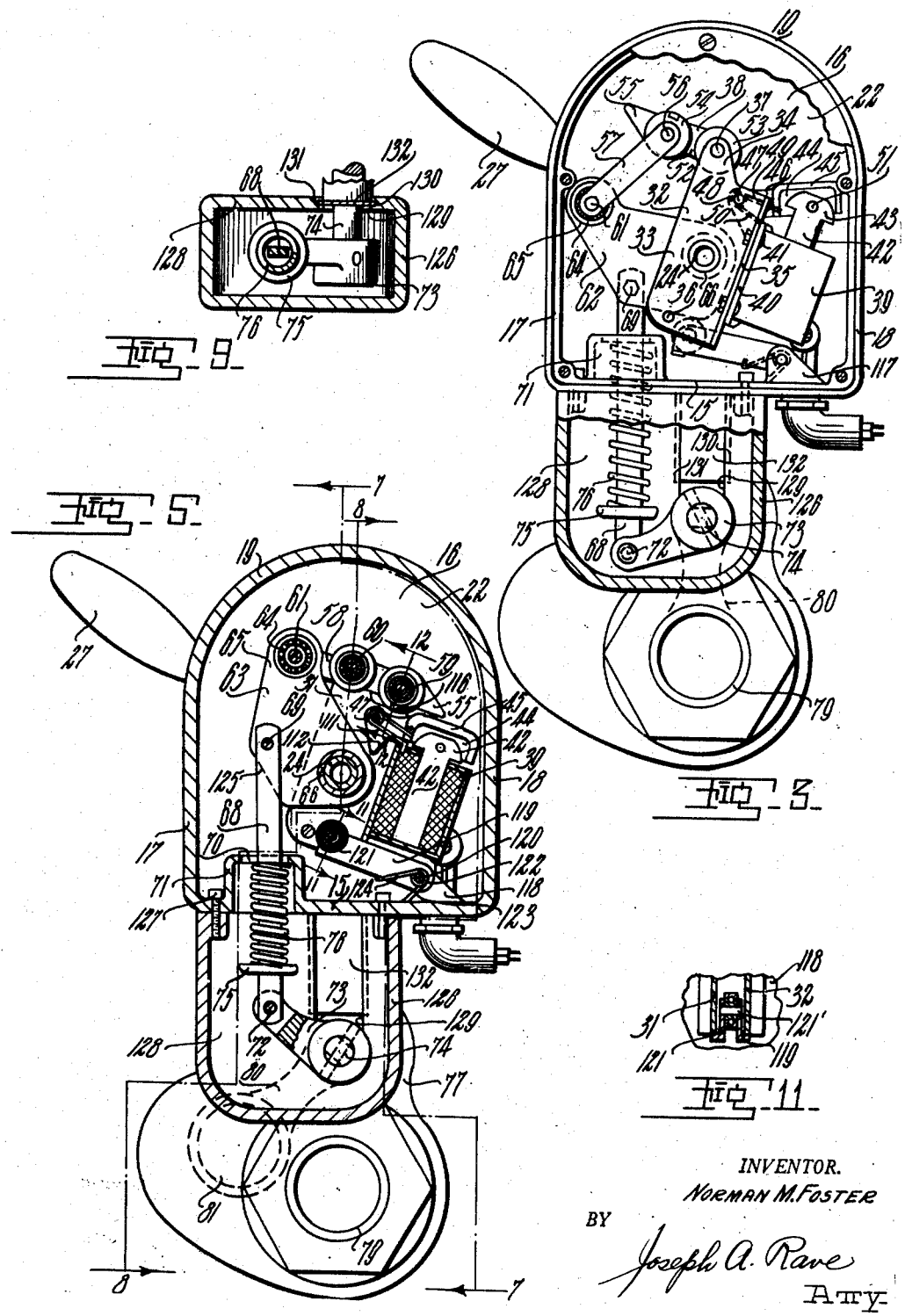

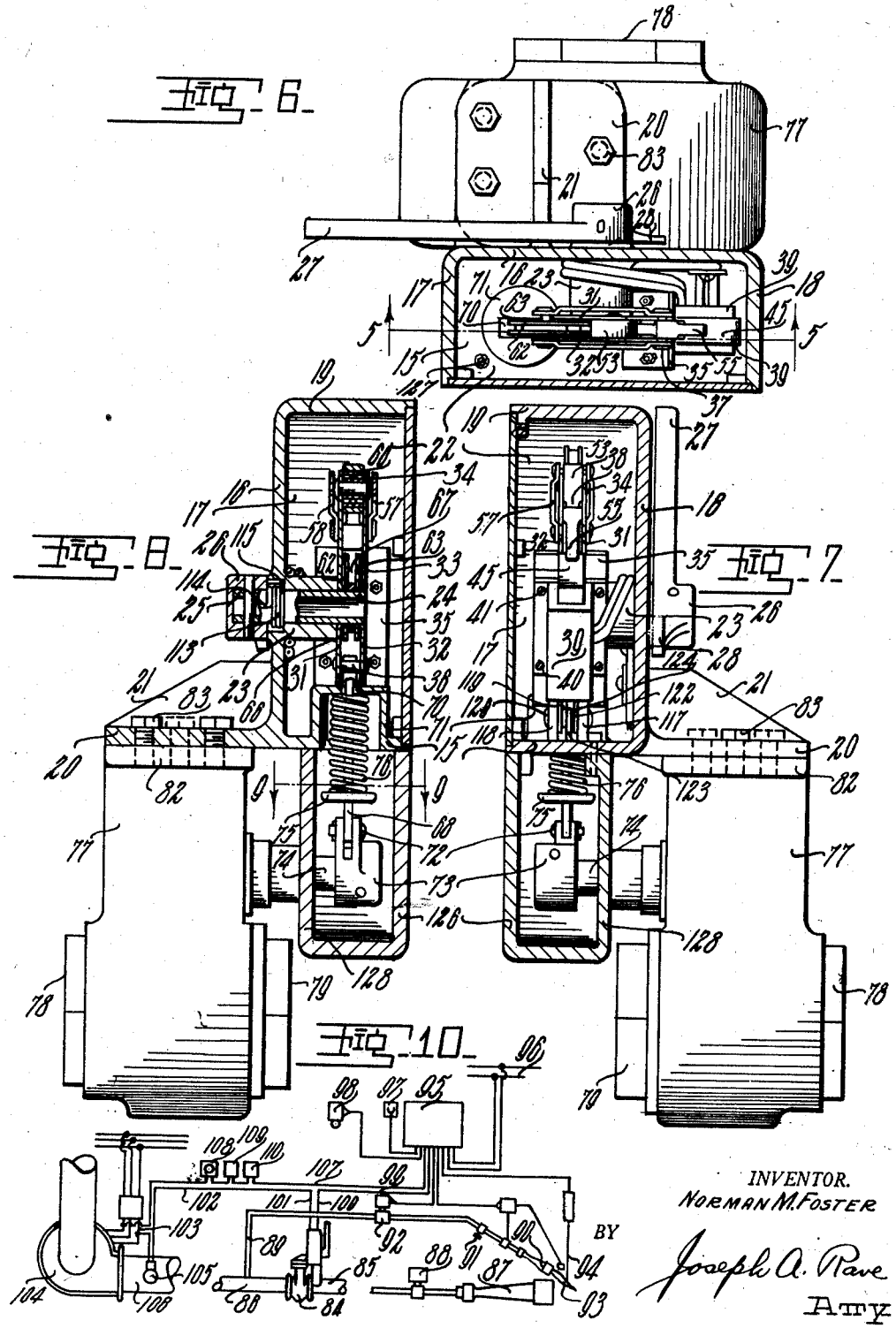

Patented July 24, 1951

2,561,618

UNITED STATES PATENT OFFICE 2,561,618

VALVE ACTUATOR

Norman M. Foster, New Castle, Ind., assignor to Western Products, Incorporated, New Castle, Ind., a corporation of Indiana Application September 1, 1948, Serial No. 47,163

14 Claims. (Cl. 74—2)

This invention relates to improvements in a safety valve and particularly to improvements in the means whereby the valve is operated.

The valve actuating mechanism of the present invention is an improvement on the mechanism disclosed in applicant's Patent 2,218,606 for Valve which issued on October 22, 1940.

Safety valves find their principal use in connection with systems utilizing fluid fuel such as gas and oil. Safety valves are in effect automatic shut-off valves which automatically operate upon failure of either the fuel or the power which is utilized in the above noted fluid fuel burning systems. The mechanism of the present invention similar to that disclosed in the above identified patent is impossible of being operated unless the system is in proper condition for operation and cannot be by-passed or side-stepped to have the valve opened as is possible with valves of the so called automatic shut-off type that have been available.

The mechanism of the present invention while absolutely fool-proof is considerably lighter in weight and simpler in construction than the mechanism disclosed in the above identified patent.

It is, therefore, the principal object of the present invention to provide a compact safety valve or automatic shut-off valve which can be opened only when the system in which the valve is employed is in proper operating condition.

Another object of this invention is the provision of a valve operating mechanism that immediately closes the valve when conditions require it and upon closing permits the operating mechanism to be reset for subsequent operation of the valve when the system is in proper condition.

Another object of this invention is the provision of a valve actuating mechanism that is more positive in its valve closing operation than heretofore employed.

A still further object of this invention is the provision of a valve actuating mechanism that is extremely simple in its construction, utilizing a minimum of parts and having a long and trouble-free life yet it is extremely light in weight commensurate with the duty it must perform.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is an elevational view of an automatic shut-off valve embodying the principles and construction of the present invention.

Fig. 2 is an elevational view of the valve of Fig. 1 on a larger scale with the cover partially removed and parts in cross-section for more clearly illustrating the same.

Fig. 3 is a view similar to Fig. 2 showing the parts of the valve actuating mechanism in the position when attempting to open the valve when the system is not in condition for opening the same.

Fig. 4 is a view similar to Fig. 2 showing the parts in the position for opening the valve when the system is in proper condition to have the valve opened.

Fig. 5 is a view of the valve actuating parts in position with the valve open and as seen from line 5—5 on Fig. 6.

Fig. 6 is a top plan view of the valve and its mechanism with the housing for the mechanism in cross-section.

Fig. 7 is an end elevational view of the valve actuating mechanism with the housing therefor in cross-section as seen from line 7—7 on Fig. 5.

Fig. 8 is a view partly in section and partly in elevation and seen from the other side of Fig. 5 on line 8—8 on said Fig. 5.

Fig. 9 is a transverse sectional view through the connecting link between the valve and its actuating mechanism as seen from line 9—9 on Fig. 8.

Fig. 10 is a diagrammatic view illustrating some of the possible uses of the control valve mechanism.

Fig. 11 is an enlarged, fragmentary, sectional view through certain parts of the device as seen from line 11—11 on Fig. 5.

Fig. 12 is an enlarged, fragmentary, sectional view through certain parts of the device as seen from line 12—12 on Fig. 5.

Throughout the several views of the drawings similar reference characters are employed to denote the same or similar parts.

The valve controlled mechanism of the present invention comprises a main or supporting plate 15 from three sides of which upwardly projects the enclosing housing, comprising a front 16 and side walls 17 and 18 joined at their upper ends by a rounded or arcuate top 19. Forwardly of the housing front 16, in the plane of the supporting plate 15 and as a continuation of said plate 15, is a flange 20 reinforced by a rib 21 upstanding therefrom and integral at its rear end with the housing front 16.

The housing front 16 has projecting therefrom into the interior 22 of the housing a hollow boss or sleeve 23 which forms the sole support for the valve actuating mechanism. The boss or sleeve 23 has rotatably or oscillatably journaled therein a shaft 24 illustrated in the drawings as a hollow sleeve. The shaft 24 projects forwardly of the housing front 16 and has pinned or otherwise secured to the said projecting portion 25 of the shaft 24 the hub 26 of an actuating lever 27. The lever 27 has one end thereof suitably shaped to provide a comfortable grip while its other end is formed as a pointer 28 cooperating with suitable indicia 29 and 30 on the front face of the housing front wall 16 for indicating whether the valve, controlled thereby, is open or closed, said positions being respectively indicated in the drawings as "on" or "off."

Secured to the shaft 24 within the housing space 22 is the carrier comprising a pair of plates 31 and 32 each having a contour in plan most clearly illustrated for plate 32 in Fig. 3. Each of the carrier plates 31 and 32 includes a body portion 33 from the upper end of which extends a finger 34 and which has its right-hand edge, see Fig. 3, outwardly turned to form a flange 35. The said carrier plates 31 and 32 respectively have their flanges 35 projecting in opposite directions as seen, for example, in Figs. 6, 7 and 8. The plates 31 and 32 are secured to the shaft 24 in any suitable or desirable manner preferably by welding and are secured in spaced apart relation with the plate 31 adjacent the end of the housing lug or boss 23 and the plate 32 at the end of the shaft 24.

The carrier plates 31 and 32 have their lower ends retained in spaced apart relation by a rivet 36 which, as will later be made clear, acts as a locking pin for locking the valve actuating mechanism in its valve open position. The upper end of the carrier plates 31 and 32 is similarly maintained in spaced apart relation by a rivet-pin 37 which also serves a dual purpose namely that of a shaft for the releasing and locking trigger indicated in its entirety by the reference numeral 38.

The carrier plates 31 and 32 through their flanges 35 have mounted thereon a solenoid coil 39 which has at its inner vertical edges flanges 40 in face contact with the carrier plates flanges 35 and through which contacting flanges suitable bolts or the like 41 extend in securing the parts to one another. Slidably disposed in the solenoid coil 39 is the solenoid core 42 having at its upper end a head 43 centrally slotted to receive a web 44 centrally of a trigger actuating member or hammer 45.

The hammer 45 has rearwardly projecting therefrom a tongue 46 which is disposed between the carrier plates 31 and 32 and is mounted on a pin 47 carried by said plates and with said hammer tongue 46 substantially spanning the space therebetween. The pivot pin 47 also serves as a means for supporting a torsional spring 48 which has one of its arms 49 in engagement with the hammer head 45 and its other arm 50 anchored against the solenoid coil 39 whereby the hammer head 45 is normally retained in a raised position illustrated in Fig. 3. The hammer head web 44 and solenoid core 42 are pivotly connected to one another through a pivot pin 51.

The trigger 38 comprises a body portion 52 having at one end an enlarged collar 53 through which extends the pivot-rivet 37. The trigger body portion 52 has at its other end a similar enlarged collar portion 54 from which projects a finger 55 that normally overlies the hammer head 45 as illustrated in Fig. 2.

The trigger collar 54 has pivoted thereto, as by rivet 56, on each side thereof, one end of links 57 and 58. The connection between the links 57 and 58 and the trigger 38 is through a ball bearing 59 carried by the trigger collar 54 and as clearly illustrated in Fig. 5. It should be here noted that the pivotal connection of the link collar 53 with carrier plates 31 and 32 is through a ball bearing 60, also clearly illustrated in Fig. 5.

The other ends of the links 57 and 58 are pivotly connected through a rivet 61 with a pair of actuating plates or sectors 62 and 63 which are each mounted on the outer race of a ball bearing 64 which forms the pivotal connection of said other ends of the links 57 and 58 with the actuating plates or sectors 62 and 63.

The actuating plates or sectors have a contour, in plan, as illustrated in Figs. 2, 3, 4 and 5 which may be described as substantially rectangular with an upwardly projecting portion 65 which is the portion that receives the ball bearing 64. The actuating plates or sectors 62 and 63 are provided in their lower corners with apertures to be loosely mounted on the operating shaft or sleeve 24 as illustrated in Fig. 8. The said actuating plates 62 and 63 are connected to one another through a spacing collar 66 that has a rotating or oscillating bearing on the operating shaft or sleeve 24. By this construction there is provided between the carrier plates 62 and 63 a space 67 which receives the valve operating link 68.

The valve operating link 68 has its upper end apertured for a pivot 69 which is carried by the actuating plates 62 and 63 and spans the space 67 therebetween. The link 68 extends through an aperture 70 in a hollow boss 71 which upstands interiorly of the housing 22 from the plate 15. As seen in the drawings the link 68 is relatively thin by comparison with its width wherefor the aperture 70 is a relatively narrow slit extending through the top of the said hollow boss 71. The lower end of the link 68 is pivotly connected at 72 with the outer end of a crank or lever 73 keyed or otherwise secured to the end of valve actuating shaft 74. Secured to and carried by the link 68 near the pivot 72 and lever 73 is a plate or washer 75 forming one abutment for an expansion coil spring 76 which has its other end in abutment with the undersurface of the boss 71.

The valve, per se, may be of any suitable or desirable construction and includes a valve body 77 having an inlet 78 on one side thereof and an outlet 79 on its other side. Interiorly of the body 77 the valve shaft 74 has secured thereto an arm 80 which oscillates therewith said arm carrying at its inner end a valve member 81, adapted in the closed position of the valve, to prevent flow through the valve outlet 79.

In order to connect the valve body 77 with the actuating mechanism it is provided at its upper end with a mounting flange 82 in face contact with the undersurface of the actuating mechanism flange 20 with said flanges connected to one another through a plurality of suitable bolts 83.

There is illustrated in Fig. 10, to which reference is now to be had, some of the various uses to which a safety valve of this invention is applied. As seen in Fig. 10, the safety valve of this invention is indicated in its entirety by the reference numeral 84, connected between pipe sections 85 and 86, respectively, connected with the valve inlet 78 and valve outlet 79 and through which flows the fluid fuel, such as gas or oil. The pipe 86 terminates in a burner 87 and the pipe 85 has therein, just ahead of the burner 87, the regulating valve 88. Tapped into the pipe 85, ahead of the safety valve 84, is the pilot line or pilot fuel supply pipe 89, which terminates in the pilot burner 90, and the pipe 89 has therein the regulating valve 91, automatic valve 92 and such other auxiliary equipment as is necessary, and which equipment is auxiliary to the protection afforded by the valve of the instant application. Within the pilot flame 93 is the electrode rod 94, electrically connected with a suitable relay mechanism 95, which is in turn electrically connected with a power supply 96. The relay 95 has also connected therewith auxiliary mechanism, such as the push button 97 for operating the pilot automatic valve 92 and a signal 98 for visibly or audibly indicating the interruption of the operation of the system.

The relay 95 is also connected, as by the lead or wire 99, with the lead or wire 100 from one end of the solenoid coil 39 of the valve controlled mechanism. The other lead or wire 101 of the solenoid coil 39 is connected to a wire 102 that extends to the power supply lines 103 which operates the motor of a recirculating or exhaust fan or the like 104. The said second lead or wire 101 of the solenoid 39 has therein included an air-flow switch 105 associated with the pipe or duct 106 of the fan 104. The companion lead or wire 107, from the relay 95, is likewise connected with the power supply lines 103 and may have included therein various automatic switches such as 108, 109 and 110, the operation of any one of which will effect the operation of the safety valve.

The operation of the system illustrated in Fig. 10 is as follows:

The push button 97 is operated for releasing the automatic valve 92 and causing a fuel flow through the pilot line 89 to the pilot burner 90 which is then ignited in the usual way, producing the flame 93. The fan 104 is now started, or may have been previously started, which, when the proper volume of air or velocity or flow of air is set up in the pipe or conduit 106, closes the switch 105. The other safety switches 108, 109 and 110 are now closed or cut in, depending upon their position in the system. The flame 93, acting on the electrode rod 94, causes current to flow through the relay 95, which in turn causes current to flow from the power lines 103 through the lead 101 and air flow switch 105 therein, solenoid 39, leads 100 and 99, relay 95, line 107 and automatic switches 108, 109 and 110, to the power lines 103. At this time the safety valve 84 may be manually operated to start a flow through the pipe 86.

The operation of the valve and its mechanism is as follows:

With the current off the valve actuating parts are in the position as illustrated in Fig. 2 with the torsional spring 48, through its arms 49 and 50, holding the hammer in the position there illustrated. In order to hold the hammer 45 in this position the hammer tongue 46 is provided with a depending ear 111 which has an abutment face 112 to contact the solenoid coil casing on its inner side, as seen in the drawings. The hammer head 45 withdraws the solenoid core 42 from the coil and at the same time through its contact with the trigger finger 55 elevates the said trigger so that the rivet-pivots 61 and 56 are in a plane above a parallel plane passing through the rivet-pivot 37. At this time the coil spring 76 is fully expanded for maintaining the valve disc 81 in the closed position in Fig. 2.

The actuation of the lever 27 from its downward, or off position, to its upward, or on position, tends to actuate the carrier plates 31 and 32 from the position of Fig. 2 to the position of Fig. 3. At this time and with the actuating plates or sectors 62 and 63 under spring tension, the movement of the carrier plates 31 and 32, in a clockwise direction, causes the links 57 and 58 to swing the trigger 38 away from the hammer 45 as illustrated in Fig. 3 thereby in no way disturbing the position of the valve member 81 with respect to the valve outlet. In other words, with no current in the solenoid coil 39 the actuation of the lever 27 merely results in the oscillation of the carrier plates 31 and 32 without in anywise actuating the valve member 81.

Release of the handle or actuating lever 27 returns the parts to their normal position which is effected by a spring 113, see Fig. 8, which encircles the actuating shaft or sleeve 24 having one end 114 connected with the said shaft or sleeve 24 and the other end 115 connected with the housing bearing or boss 23 or the housing front plate 16.

Closing of the actuating switch or push button 97 for effecting a current flow as above described in connection with the control system, energizes the solenoid coil 39 thereby drawing into itself the core 42 and lowering the hammer head 45 from the position of Figs. 2 and 3 to the position of Figs. 4 and 5. This permits the trigger 38 to drop below its normal position to have the plane through the pivots 61 and 56 to be below a parallel plane which includes the pivot 37 whereby setting up a latching of the carrier plates 31 and 32 with the actuating plates 62 and 63. In order to properly position the trigger 38 in the latching position it has laterally projecting from each side of its collar 54 a lug or ear 116 which, in its latching position, engages the upper edge of carrier plates 32 and 33 as illustrated in Figs. 5 and 12.

Actuation of the actuating lever or handle 27 from its off, or downward position, to its on, or upward position, now shifts or oscillates the carrier plates 31 and 32 along with the actuating plates or sectors 62 and 63 from the solid line position in Fig. 4 to the phantom line position thereof or to the solid line position of Fig. 5 for thereby raising the link 68 which through the crank or lever 73 oscillates the valve shaft 74 for shifting the valve member 81 to its open position as illustrated in Fig. 5.

In order to lock the valve in this open position a locking mechanism is provided comprising a pair of upstanding ears or lugs 117 and 118 integral with and upstanding from the housing supporting plate 15, near one corner thereof. The lugs 117 and 118 are spaced from one another to receive one end of locking bars 119. The other end of the locking bars 119 are adapted to be projected into the space between carrier plates 32 and 33 and these bars carry at these free ends a ball bearing 121 which acts as a locking abutment. The ball bearing is mounted on a rivet-pivot 121' which retains the locking bars 119 in spaced relation. The bars 119 are yieldably actuated to their locking position by a torsional spring 122 mounted on the rivet-pivot 120 and which spring has one arm 123 anchored to the housing supporting plate 15 and has its other arm 124 operatively engaged with one of the locking bars 119.

In the normal position of the parts the abutment or ball bearing 121 is engaged by the actuating plates or sectors 62 and 63 and held out of latching or locking position. When, however, the actuating plates or sectors 62 and 63 are latched to the carrier plates 31 and 32 and moved therewith the abutment or ball bearing 121 is free to be moved into the space between the said carrier plates 31 and 32. As the actuating mechanism reaches its final open position the carrier plates connecting rivet 36 is brought to a position forwardly of the abutment or ball bearing 121 so that the said abutment or ball bearing may take a position behind and slightly above the said rivet 36 thereby preventing the valve closing spring 76 and the actuating lever returning spring 113 from returning the parts to their normal positions and holding the rivet-abutment 36 in abutting engagement with the abutment-ball bearing 121 and locking the valve in its open position. In order to properly position the locking bars 119 in locking positions they each have projecting from their free ends lugs 133 that engage the under surface of the actuating plates 32 and 33.

The valve actuating parts are retained in this position with the valve member 81 in the open position until it is desired to close down the valve or a failure in fuel or the current circuit occurs. Any one of these failures or the purposeful interruption of current or fuel flow will deenergize the solenoid 39 thereby permitting the torsional spring 48 to actuate the hammer head 49 upwardly and engage the finger 55 of the latch 38 and actuate the said latch to a position for throwing its pivot-rivet 56 above the pivot-rivet 37 and thereby effect an unlatching of the carrier plates from the actuating plates. This unlatching of these parts permits the coil spring 76, placed under tension upon the opening of the valve, to expand and close the valve. As the valve closes the actuating plates or sectors 62 and 63 move to the position of Fig. 3 which permits the edge or surface 125 of said plates or sectors 62 and 63 to act as a cam and engage the abutment-ball bearing 121 and push same below the abutment-rivet 36 for thereby unlocking the carrier from its valve opening position. The unlocking of the carrier permits the actuating lever spring 113 to return the actuating mechanism to its normal position as illustrated in Fig. 2.

To prevent unlawful and unauthorized actuation of the valve shaft 74 the projecting end of said shaft, its crank or lever 73 and the lower part of the link 68 and spring 76 are suitably enclosed in a housing 126 which has its upper end open and abuts the underside of the plate 15. Suitable screws or bolts 127 are extended through the plate 115 for holding the housing 126 in its proper position. The housing 126 is provided through one of its sides 128 with a slot 129 for straddling the projecting portion of the valve shaft 74. The sides of this slot are provided with grooves 130 and 131 to receive a plate 132 slid thereinto after the housing 126 is passed over the valve shaft 74 and prior to the actual fastening of the housing by the screws 127.

From the foregoing, it is believed now evident that there has been provided a safety valve or automatic shut-off valve which is simple in construction, utilizing a minimum of parts and otherwise accomplishes the objects initially set forth.

What is claimed is:

1. In a device of the class described the combination of an actuator, a carrier, a lever connected with the carrier, a latch on the carrier adapted to connect the actuator and carrier with one another for actuating the actuator from a first to a second position, yielding means for holding the latch in unlatching position, and electro-magnetic means energizable for rendering the yielding means inoperative.

2. In a device of the class described the combination of an actuator, a carrier, a lever connected with the carrier, a latch on the carrier adapted to connect the actuator and carrier with one another for actuating the actuator from a first to a second position, yielding means for holding the latch in unlatching position, electro-magnetic means energizable for rendering the yielding means inoperative, and a yieldably positioned locking device for locking the carrier in said second position.

3. In a device of the class described the combination of an actuator, a carrier, a lever connected with the carrier, a latch on the carrier adapted to connect the actuator and carrier with one another for actuating the actuator from a first to a second position, yielding means for holding the latch in unlatching position, electro-magnetic means energizable for rendering the yielding means inoperative, a yieldably positioned locking device for locking the carrier in said second position, and yieldable means tensionable during the operation of the actuator from said first to said second position for actuating said actuator to said first position upon deenergization of the electro-magnetic means.

4. In a device of the class described the combination of an actuator, a carrier, a lever connected with the carrier, a latch on the carrier adapted to connect the actuator and carrier with one another for actuating the actuator from a first to a second position, yielding means for holding the latch in unlatching position, electro-magnetic means energizable for rendering the yielding means inoperative, a yieldably positioned locking device for locking the carrier in said second position, yieldable means tensionable during the operation of the actuator from said first to said second position for actuating said actuator to said first position upon deenergization of the electro-magnetic means, said actuator including means for operating the yieldably positioned locking device to an unlocking position, and means for returning the carrier to its said first position.

5. In a device of the class described the combination of an actuator, a carrier, a lever connected with the carrier, a latch on the carrier adapted to connect the actuator and carrier with one another for actuating the actuator from a first to a second position, yielding means for holding the latch in unlatching position, electro-magnetic means energizable for rendering the yielding means inoperative, a yieldably positioned locking device for locking the carrier in said second position, yieldable means tensionable during the operation of the actuator from said first to said second position for actuating said actuator to said first position upon deenergization of the electro-magnetic means, cam means on said actuator for releasing the yieldably positioned locking device prior to said actuator reaching its said first position to permit the return of the carrier and its lever to their said first positions, and means for returning the carrier and its lever to their said first positions.

6. In a mechanism of the class described the combination of a supporting housing, a shaft rotatably supported by said housing, a pair of spaced carrier plates secured to and movable with the shaft, a lever on said shaft for actuating same and the carrier plates from a first to a second position, an actuator freely mounted on said shaft between the spaced carrier plates, connecting means including a yieldable member carried by the actuator, latch means for latching the actuator and carrier plates to one another for unitary movement with the shaft for thereby actuating the connecting means and tensioning the connecting means yieldable member, and means for rendering the latch inoperative so that the connecting means yieldable member actuates the actuator and connecting means independently of the shaft.

7. In a mechanism of the class described the combination of a supporting housing, a shaft rotatably supported by said housing, a pair of spaced carrier plates secured to and movable with the shaft, a lever on said shaft for actuating same and the carrier plates from a first to a second position, an actuator freely mounted on said shaft between the spaced carrier plates, connecting means including a yieldable member carried by the actuator, latch means for latching the actuator and carrier plates to one another for unitary movement with the shaft for thereby actuating the connecting means and tensioning the connecting means yieldable member, means for rendering the latch inoperative so that the connecting means yieldable member actuates the actuator and connecting means independently of the shaft, and yielding means for actuating the shaft and carrier plates from said second to said first position.

8. In a mechanism of the class described the combination of a supporting housing, a shaft rotatably supported by the housing, a carrier secured to and movable with the shaft, a lever on the shaft for actuating same and the carrier from a first to a second position, an actuator freely mounted on said shaft, said carrier and actuator each having projecting portions located behind one another, means carried by one of said carrier and actuator projecting portions for connecting said carrier and actuator to one another for unitary movement by the lever and shaft, yielding means for rendering the connecting means inoperative, and electro-magnetic means for rendering the yielding means inoperative when the actuator and carrier are to be connected to one another.

9. In a mechanism of the class described the combination of a supporting housing, a shaft rotatably supported by said housing, a carrier secured to and movable with the shaft, a lever for actuating the shaft and carrier from a first to a second position, an actuator loosely mounted on said shaft, said carrier and actuator each having a projecting portion behind one another, latching links pivotly carried by the projection of the actuator, a trigger pivotly connecting the latching links to the projecting portion of the carrier, yielding means for actuating the trigger to a position for rendering the latching links inoperative, and electro-magnetic means energizable for rendering the yielding means inoperative so that the trigger positions the latching links for latching the carrier and actuator to one another for unitary operation from said first to said second position.

10. In a mechanism of the class described the combination of a supporting housing, a shaft rotatably supported by said housing, a carrier secured to and movable with the shaft, a lever for actuating the shaft and carrier from a first to a second position, an actuator loosely mounted on said shaft, said carrier and actuator each having a projecting portion behind one another, latching links pivotly carried by the projection of the actuator, a trigger pivotly connecting the latching links to the projecting portion of the carrier, yielding means for actuating the trigger to a position for rendering the latching links inoperative, and electro-magnetic means energizable for rendering the yielding means inoperative so that the trigger positions the latching links for latching the carrier and actuator to one another for unitary operation from said first to said second position, comprising a movable core connected with the last mentioned yieldable means and operable thereby for actuating the trigger upon deenergization of the electro-magnetic means.

11. In a mechanism of the class described the combination of a supporting housing, a shaft rotatably supported by said housing, a carrier secured to and movable with the shaft, a lever for actuating the shaft and carrier from a first to a second position, an actuator freely mounted on said shaft, said carrier and actuator each having a projecting portion behind one another, latching links pivotly carried by the projection of the actuator, a trigger pivotly connecting the latching links to the projecting portion of the carrier, yielding means for actuating the trigger to a position for rendering the latching links inoperative, electro-magnetic means energizable for rendering the yielding means inoperative so that the trigger positions the latching links for latching the carrier and actuator to one another for unitary operation from said first to said second position, comprising a movable core connected with the last mentioned yieldable means and operable thereby for actuating the trigger upon deenergization of the electro-magnetic means, and a yieldably positioned locking device for locking the carrier in said second position.

12. In a mechanism of the class described the combination of a supporting housing, a shaft rotatably supported by said housing, a carrier secured to and movable with the shaft, a lever for actuating the shaft and carrier from a first to a second position, an actuator loosely mounted on said shaft, said carrier and actuator each having a projecting portion behind one another, latching links pivotly carried by the projection of the actuator, a trigger pivotly connecting the latching links to the projecting portion of the carrier, yielding means for actuating the trigger to a position for rendering the latching links inoperative, electro-magnetic means energizable for rendering the yielding means inoperative so that the trigger positions the latching links for latching the carrier and actuator to one another for unitary operation from said first to said second position, comprising a movable core connected with the last mentioned yieldable means and operable thereby for actuating the trigger upon deenergization of the electro-magnetic means, a yieldably positioned locking device for locking the carrier in said second position, and yieldable means, tensioned during the operation of the actuator from said first to said second position, for actuating said actuator to said first position upon deenergization of the electro-magnetic means.

13. In a mechanism of the class described the combination of a supporting housing, a shaft rotatably supported by said housing, a carrier secured to and movable with the shaft, a lever for actuating the shaft and carrier from a first to a second position, an actuator loosely mounted on said shaft, said carrier and actuator each having a projecting portion behind one another, latching links pivotly carried by the projection of the actuator, a trigger pivotly connecting the latching links to the projecting portion of the carrier, yielding means for actuating the trigger to a position for rendering the latching links inoperative, electro-magnetic means energizable for rendering the yielding means inoperative so that the trigger positions the latching links for latching the carrier and actuator to one another for unitary operation from said first to said second position, comprising a movable core connected with the last mentioned yieldable means and operable thereby for actuating the trigger upon deenergization of the electro-magnetic means, a yieldably positioned locking device for locking the carrier in said second position, yieldable means, tensioned during the operation of the actuator from said first to said second position, for actuating said actuator to said first position upon deenergization of the electro-magnetic means, said yieldably positioned locking device including an abutment cooperating with an abutment on the carrier, and means on said actuator for separating the locking device and carrier abutments upon actuation of the actuator from its said second to its said first position to permit the return of the carrier and its lever to their said first positions.

14. In a mechanism of the class described the combination of a supporting housing, a shaft rotatably supported by said housing, a carrier secured to and movable with the shaft, a lever for actuating the shaft and carrier from a first to a second position, an actuator loosely mounted on said shaft, said carrier and actuator each having a projecting portion behind one another, latching links pivotly carried by the projection of the actuator, a trigger pivotly connecting the latching links to the projecting portion of the carrier, yielding means for actuating the trigger to a position for rendering the latching links inoperative, electro-magnetic means energizable for rendering the yielding means inoperative so that the trigger positions the latching links for latching the carrier and actuator to one another for unitary operation from said first to said second position, comprising a movable core connected with the last mentioned yieldable means and operable thereby for actuating the trigger upon deenergization of the electro-magnetic means, a yieldably positioned locking device for locking the carrier in said second position, yieldable means, tensioned during the operation of the actuator from said first to said second position, for actuating said actuator to said first position upon deenergization of the electro-magnetic means, said yieldably positioned locking device including an abutment cooperating with an abutment on the carrier, means on said actuator for separating the locking device and carrier abutments upon actuation of the actuator from its said second to its said first position to permit the return of the carrier and its lever to their said first positions, and yielding means for returning the carrier and its lever to their said first positions.

NORMAN M. FOSTER.

REFERENCES CITED

The following references are of record in the file of this patent:

UNITED STATES PATENTS

| Number | Name | Date |
|---|---|---|
| 2,218,606 | Foster | Oct. 22, 1940 |